June 6, 1961  D. T. DANIELE ET AL  2,987,159
AUTOMATIC DETECTION, FEED AND DETOUR CHUTE
Filed March 11, 1959  5 Sheets-Sheet 1

INVENTORS
D. T. Daniele &
E. C. Witt, Jr.
BY Karl W. Flocks
ATTORNEY

June 6, 1961 D. T. DANIELE ET AL 2,987,159
AUTOMATIC DETECTION, FEED AND DETOUR CHUTE
Filed March 11, 1959 5 Sheets-Sheet 2

INVENTOR
D. T. Daniele &
E. C. Witt, Jr.
BY Karl W. Flocks
ATTORNEY

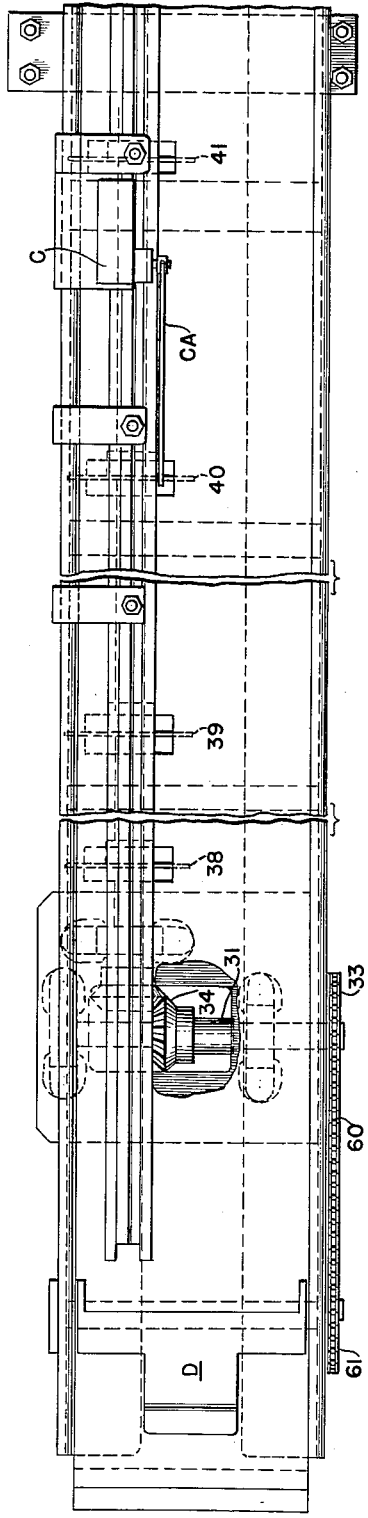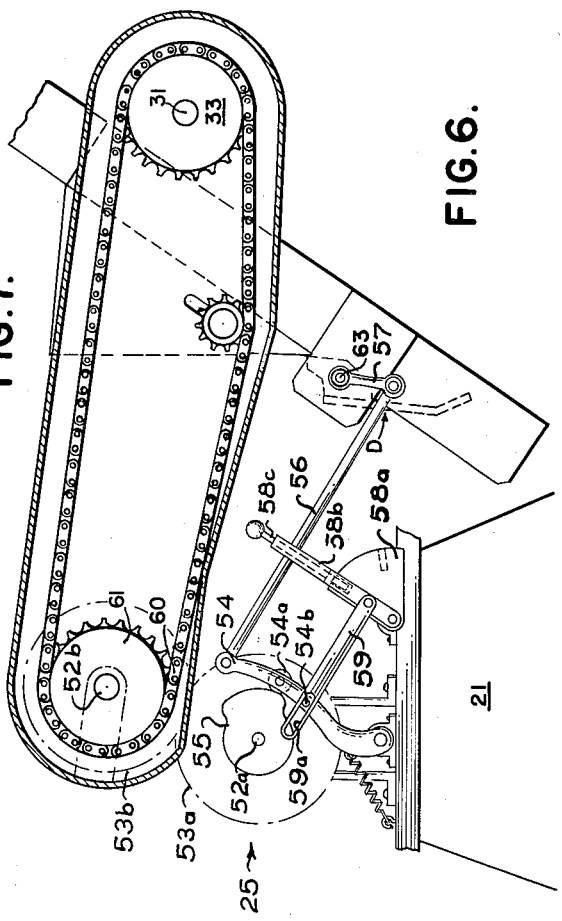

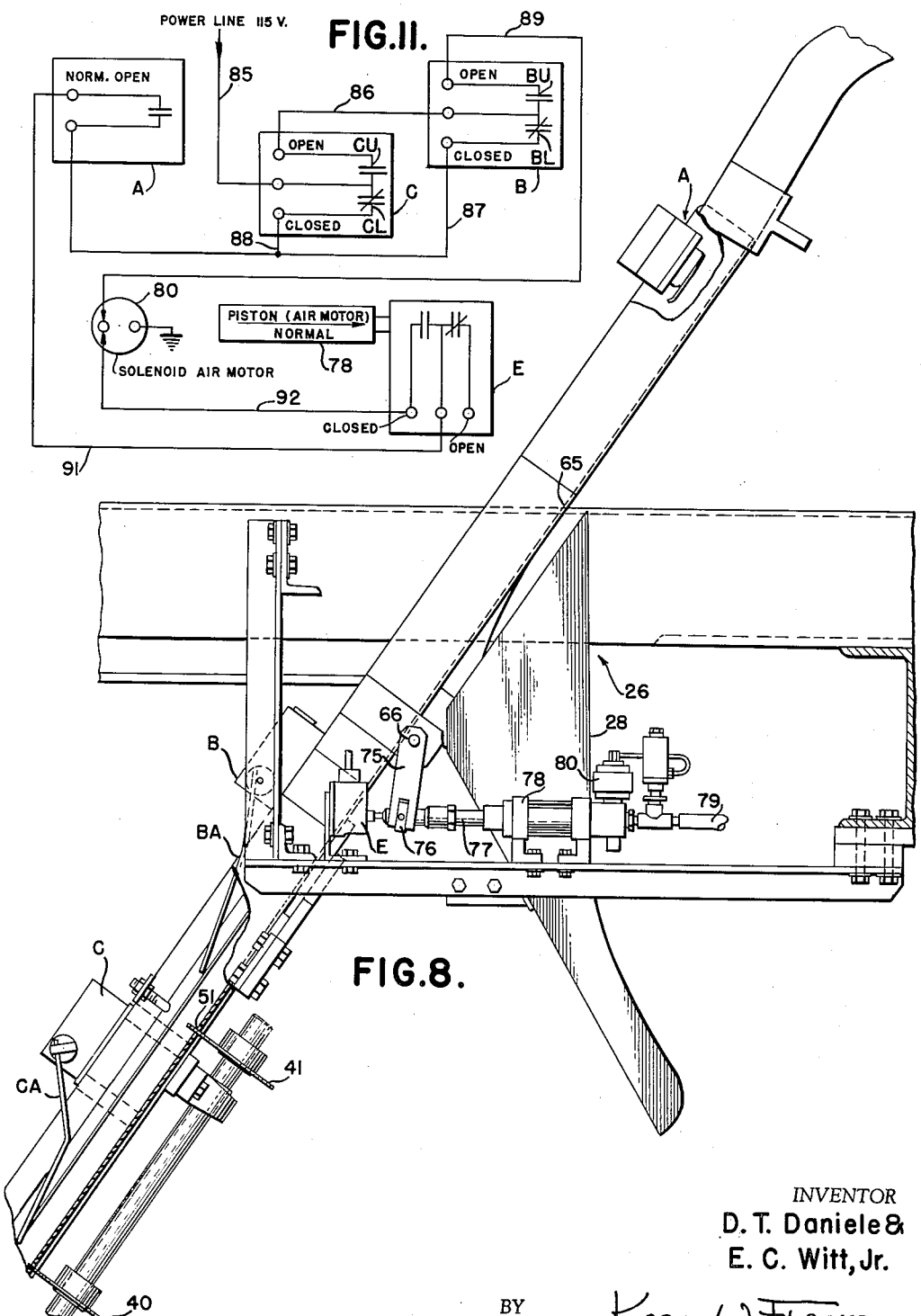

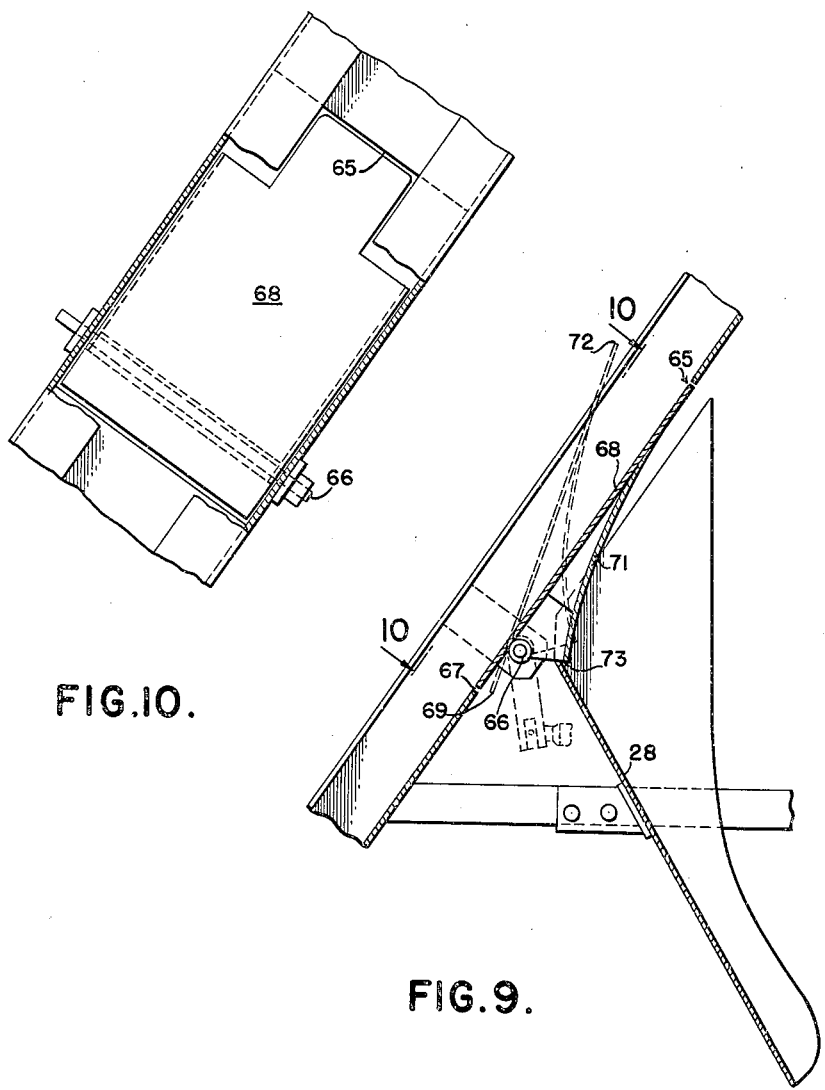

United States Patent Office 2,987,159
Patented June 6, 1961

2,987,159
AUTOMATIC DETECTION, FEED AND DETOUR CHUTE
Donald T. Daniele, East Longmeadow, and Edgar C. Witt, Jr., Palmer, Mass., assignors to Diamond National Corporation, a corporation of Delaware
Filed Mar. 11, 1959, Ser. No. 798,780
10 Claims. (Cl. 193—31)

The present invention relates to an automatic detection, feed and detour chute, and more particularly to such a chute in which a feed section permits articles to descend the chute in step-by-step fashion, in which detection devices are provided to detect a jam on the chute, and in which a detour door is opened and closed through operation of the detection devices.

The present invention was particularly conceived in relation to the feeding of molded pulp articles into a press, this press serving to iron out wrinkles and other imperfections in the freshly molded and dried articles and to in general give them a uniform and pleasing appearance. It will be understood, of course, that the present invention is not limited to such an application.

Switching arrangements in chutes are known in the prior art, including arrangements which provide for the switching of cartons being delivered by one chute to another chute, and this has been accomplished with the use of detection devices, such as switches, for controlling the operation of the switching apparatus. However, such chute systems as are known to the prior art have usually dealt with such objects as cans, and therefore the consideration of damage to the article has not arisen. Also, there has not been anticipated in the prior art chute system the problem of jamming the switching mechanism by the articles handled by the chute, and hence no provision has been made to avoid such a jamming.

While prior art feeding mechanisms for objects descending a chute or the like are known, these feeding devices having members that alternately enter into and withdraw from the path of articles descending the chute, these feeding devices have not provided for the ready timing thereof with a machine being fed by the chute, have been relatively expensive in some instances, and have not provided for the control of more than two articles on the chute.

Further, none of the prior art chute systems have provided for the detouring of relatively light weight articles fed at a high rate down the chute, and thus have not suggested how to solve the problem of redirecting such articles.

An object of the present invention is to provide a chute for feeding articles in timed relation to a press or other machine.

Another object of the present invention is the provision of a feed chute system that will sense a jamming up of articles and detour additionally supplied articles.

A further object is to provide a feed chute system which will detour articles if the chute jams and re-direct the articles when the jam is cleared.

Yet another object of the present invention is to provide a chute in which a detour door is prevented from closing on an article, after a jam occurs and is cleared.

Another object of the present invention is the provision of an economical feed section of a chute that may be readily synchronized with cyclically operated machinery fed by the chute.

A further object of the present invention is to provide a detour door that will re-direct articles traveling at high speed along a chute without damage to the article.

Other objects and the nature and advantages of the instant invention will be apparent from the following description taken in conjunction with the accompanying drawings, wherein.

Figure 1:
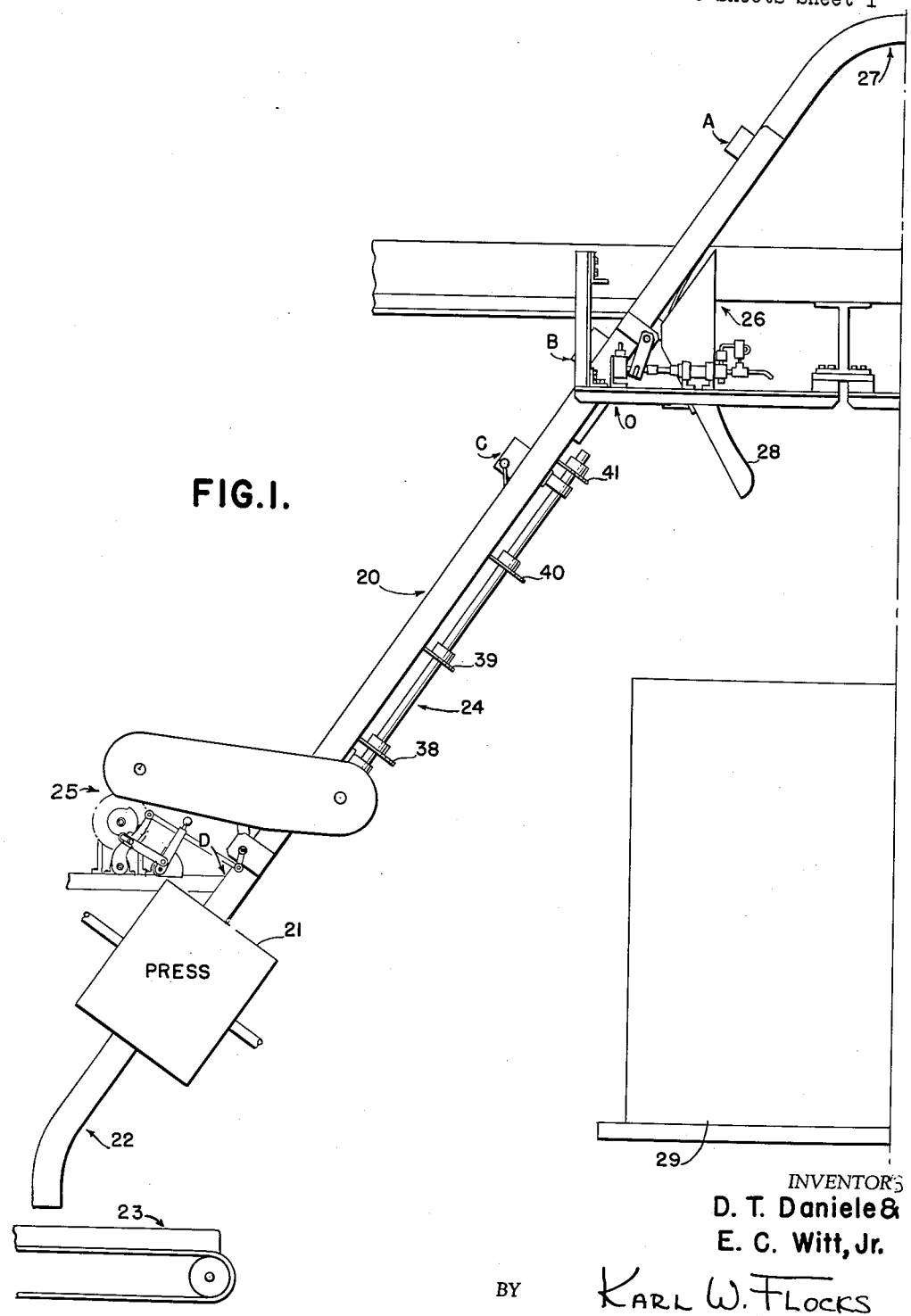
FIG. 1 is an elevational view of a chute system in accordance with the present invention.
Figure 4:
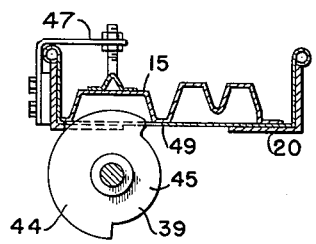
Figure 5:
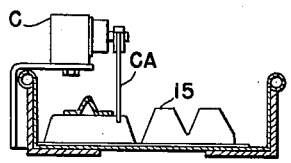
Figure 3:
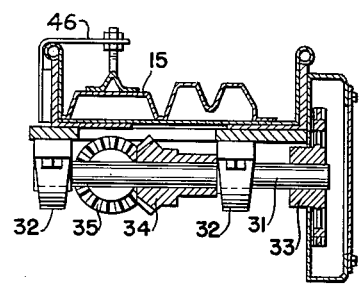
Figure 2:
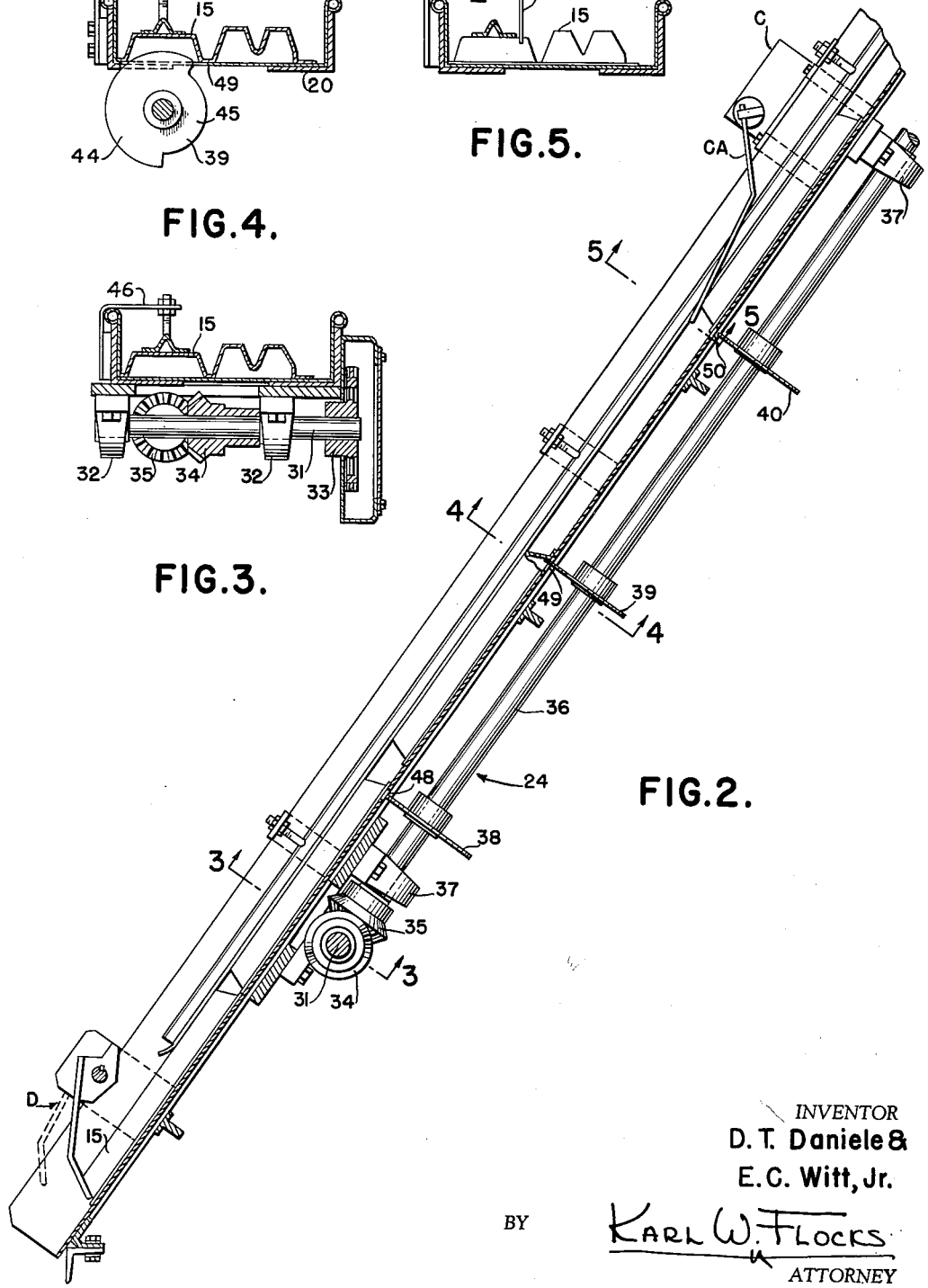
FIG. 2 is an elevational view, partly in section, of the feeding section of the chute shown in FIG. 1.

FIGS. 3, 4 and 5 are cross sectional views taken on the lines 3—3, 4—4 and 5—5 of FIG. 2, respectively;

FIG. 6 is an elevational view, with parts in section, of the linkage synchronizing movement of the press and movement of the chute feeding section;

FIG. 7 is a plan view of the feeding section of the chute;

FIG. 8 is an enlarged, fragmentary elevational view of the detour section of the chute shown in FIG. 1;

FIG. 9 is an enlarged elevational view, partly in section, of the detour door of the detour section of the chute shown in FIG. 1;

FIG. 10 is a plan view of the detour door shown in FIG. 9, with parts in section and broken away;

FIG. 11 is a wiring diagram for the detection devices and motor of the chute system.

Referring now to the drawings, wherein like reference characters are used to designate like or corresponding parts throughout the several views, there is shown in FIG. 1 a chute system including a U-shaped chute generally designated 20, the system feeding articles to a cyclically operating machine which in the present instance is a press 21. From the press 21 articles are delivered by a terminal chute 22 onto a take-off conveyor 23, although it will be understood that other off-take apparatus may be used. Articles are permitted to descend the chute in a step-by-step fashion by a feed section 24, operation of which is effected in timed relation to the press 21 by the synchronizing mechanism 25. Above the feed section 24 is a detour section 26, and above the detour section 26 is an intake section generally designated 27. It will be understood of course that articles to be pressed in the press 21 are fed into the intake section 27 from a suitable source, not shown. There may also be seen in FIG. 1 a switch A between the intake section 27 and the detour section 26, a switch B at the outlet end of the detour section 26, a switch C in the feed section 24 and a stop arm D at the discharge end of feed section 24.

Detour section 26 also has connected therewith a detour chute 28 which has a receiving bin 29 there below to receive articles that are detoured by detour section 26.

As may be seen in FIGS. 2 and 3, a shaft 31 is journaled transversely beneath the chute of the system in bearings 32 and has a sprocket 33 on one end thereof. The shaft 31 also carries a bevel gear 34 which is in mesh with a bevel gear 35 that is secured to one end of drive shaft 36. Drive shaft 36 is journaled in bearings 37 on the underside of chute 20 and extends lengthwise of the chute 20. At suitably spaced intervals on drive shaft 36 there are secured a plurality of detents 38, 39, 40 and 41, there being but the three lower detents 38, 39 and 40 shown in FIG. 2. Each of the detents 38, 39, 40 and 41 is of substantially the same configuration and is attached to a collar which may be readily fixed in any desired position longitudinally of the drive shaft 36, as by a set screw.

In FIG. 4, there may be seen the shape of detent 39, this detent having a part 44 thereof having a relatively great radius and a second part 45 thereof having a relatively smaller radius. The chute 20 has a series of spaced apertures, 48, 49 and 50 (see FIG. 2) which are in the floor thereof through which the parts 44 of the several detents will extend during certain parts of the revolution of shaft 36. It will be understood, of course, that there is a similar aperture for the detent 41, and that the several detents are placed on the drive shaft 36 in registry with the above mentioned apertures. As may be seen from FIG. 4, the part 44 which is of greater radial extent has a circumferential extent of more than 180° and that consequently the part 45 of smaller radial extent has a circumferential extent of less than 180°. The several detents 38, 39, 40 and 41 are arranged on the drive shaft 36 in alternate relationship; that is to say, when the median radius of part 44 of detent 38 is in a vertical plane extending upwardly from the axis of drive shaft 36, the median radius of part 45 of detent 39 is in a median plane extending downwardly from the axis of drive shaft 36. Detent 40 is in registry with detent 38 and detent 41 is in registry with detent 39.

There may also be seen in FIG. 3 an article 15 descending the chute 20, article 15 being held down by a hold-down member 46. In FIG. 4, there may also be seen a carton 15 and a hold-down member 47. In FIG. 5, there is shown the switch C that is mounted above the chute 20, and has a detector arm CA pivotally secured thereto and extending downwardly into the chute 20 and contacting an article 15 therein. See also FIG. 2. Detector arm CA of switch C is pivotally mounted, and it will be understood that the position thereof is determined by the presence of absence of an article 15 thereunder on the chute 20, and that the position of arm CA in turn serves to open or close contact points within the switch C, as will be more fully explained hereinafter.

At the lower end of feed section 24, as shown in FIG. 2, there may be seen the stop arm D that also extends downwardly into the chute 20. As shown in FIG. 2, stop arm D is in position to stop an article 15, and may assume a dotted line position in which the article 15 is released to continue its travel down the chute 20 and into the press 21.

In FIG. 6, there may be seen a mechanism for synchronizing the operations of the press 21 and the feed section 24 of the chute 20. A cam shaft 52a is driven from the press and in turn drives shaft 52b through the gears 53a and 53b. A follower arm 54 is pivotally supported at its lower end and is spring urged so that the follower 54a thereof is in engagement with the cam 55 on the cam shaft 52a. A link 56 is pivotally secured to the upper end of follower arm 54, and is also pivoted to a crank arm 57 that is secured to rock shaft 63 on which the stop arm D is mounted. Rockshaft 63 is journaled transversely above chute 20.

To permit manual control of the chute, there is mounted at a convenient place a fixed sector detent 58a on which is pivoted a control lever 58b, the latter having an aixally movable rod 58c therein engageable with sockets in sector detent 58a. A link 59 is pivoted to the lever 58b intermediate the ends thereof and has a slot 59a at its other end that receives a pin 54b carried by the follower arm 54. The slot 59a permits the follower arm 54 to oscillate as the shaft 52a rotates when lever 58b is in the position shown. Upon movement of the control lever 58b in a clockwise direction, the end of slot 59a will engage the pin 54b, to thereby retain follower arm 54 in a position in which it causes the stop arm D to enter into the chute and thus halt the articles 15 descending thereon.

The shaft 52b has a sprocket 61 thereon over which is trained a chain 60, which is also trained over the aforementioned sprocket 33 that is secured to the shaft 31.

In FIG. 7 there is shown the sprockets 61 and 33, and the chain 60 between them, as well as the stop arm D and the detents 38, 39, 40 and 41. There may also be seen the switch C and the switch arm CA.

Referring now to FIG. 8, there may be seen the detour section 26, this section generally comprising the chute 20 above the feed section 24 and having the detour chute 28 connected therewith. An opening 65 is provided in said chute (see also FIGS. 9 and 10), and a door shaft 66 is journaled transversely below the chute 20 adjacent the lower edge 67 of the opening 65. A detour door 68 is secured adjacent its lower edge 69 to the door shaft 66. Detour door 68, as may be seen in FIG. 9, has a planar upper surface and an arcuate deflector 71 joined to the under side thereof at the leading or upper edge 72. As may be seen, the arcuate deflector 71 is spaced beneath the planar upper surface in the vicinity of the lower edge of 69 of the door 68.

The detour chute 28 is located, as may be seen in FIGS. 8 and 9, beneath the detour door 68 and opening 65 and is generally tangent to the lower edge 73 of arcuate deflector 71 in the open or dotted line position of the detour door 68.

Referring again to FIG. 8, it may be seen that the door shaft 66 has an arm 75 secured to it, the arm 75 depending downwardly and having a forked lower end that grips a connector 76 which is pivotally mounted on a rod 77. Rod 77 is translated axially by an air motor 78 to which air is applied from a line 79 through a solenoid 80. The end of rod 77 is in engagement with the contact of a switch E when the detour door 68 is in the closed position, and serves to hold the contacts of the switch E open. At this time, solenoid 80 and air motor 78 are not energized.

Referring now to FIG. 11, there is shown the wiring diagram for the electrical parts of the present chute system. One side of a power line, shown at 85, is connected to the movable contact of switch C. When there is no article 15 under the contact arm CA of the switch C, the movable contact thereof is in the lower position and is in engagement with the lower contact CL. Conversely, when an article 15 is on the chute beneath the switch arm CA of switch C, the movable contact is raised to engage the upper contact CU of the switch C. The movement of movable contact of the switch B is controlled in like manner by the switch arm BA of the switch B, and thus moves the movable contact into engagement with either the lower fixed contact BL or the upper fixed contact BU. A conductor 86 connects the upper contact CU of switch C with the movable contact of switch B, and a conductor 87 connects the lower contact BL of switch B with switch A. Conductor 88 connects the lower contact CL of switch C with the conductor 87, and hence to switch A.

Conductor 89 connects the upper contact BU of switch B with one post of the solenoid 80, the other post thereof being connected to ground, as shown.

Switch A, which is above the detour section 26 (see FIG. 1) is normally open, and is closed when an article 15 is therebeneath. When the switch A is closed, a circuit is completed therethrough from conductor 87 to conductor 91 which is connected between the switch A and the movable contact of switch E. Switch E, it will be recalled, is controlled with the position of detour door 68, and is open when detour door 68 is closed. The other contact of the switch E is connected by a conductor 92 with the same post of solenoid 80 as the conductor 89.

It may be seen that with articles 15 on the chute under the arms of the switches C and B, both of these switches will have the movable contact thereof in the upper position so that a circuit is completed from the conductor 85 through these switches C and B and the conductor 89 to and through the solenoid 80, and to ground. Energization of solenoid 80 actuates air motor 78 to open the detour door 68. This will release the rod 77 from engagement with the contact of switch E, so that when the detour door 68 is open the switch E is closed. If switch A is closed by having an article on the chute thereunder, and if either one of the switches C or B has the movable contact thereof moved to the lower position, while the door 68 is open, a circuit will be completed through either of the switches C and B, conductors 87 or 88, respectively, switch A, conductor 91, switch E, conductor 92, and the solenoid 80 to ground, to thereby keep the solenoid 80 energized and air supplied to the air motor 78. The reason for this arrangement will be further discussed hereinbelow.

In operation, articles may be fed into the intake section 27 at a rapid rate, and at varying intervals. These articles will descend the chute 20 and will be fed in a step-by-step manner through the feed section 24 into the cyclically operating press 21 and thence into the terminal chute 22 onto a conveyor 23. More particularly, when the press 21 operates, rotation of shaft 52a will cause the chain 60 to move and will also cause the rock shaft 63 to oscillate, both these movements being synchronized with the movement of the press 21 by the synchronizing mechanism 25. When the stop arm D is rocked so as to be raised in the chute away from the floor thereof, an article held by the stop arm D will be permitted to descend into the press. When the stop arm D is raised, the part 44 of detent 38 will be extending through the aperture 48 in chute 20, to thereby provide a stop for articles on the chute 20. Similarly, the part 44 of detent 40 will be extending through aperture 50 in chute 20 to form a stop for a second article, that will of course underlie and raise the switch arm CA of switch C. Upon the next movement of press 21, stop arm D will be moved into its down or retaining position and the article that had been held by the detent 38 will be released due to the rotation of drive shaft 36 and the placement of part 45 directly beneath the aperture 48, but not extending therethrough. This position is shown in FIG. 2. At the same time, it will be understood that part 44 of detent 39 will be in a position in which it extends through the aperture 49 in the chute 20, and that part 44 of detent 41 will also extend through the aperture 51 in chute 20. Further cyclical operation of press 21 will oscillate shaft 63 and arm D, and will rotate the drive shaft 36 so that the parts 44 of the several detents extend into and are withdrawn from the chute 20.

Should a jam occur at the press or on the feed section 24 of chute 20, the switches B and C (refer to FIGS. 8 and 11) will have the arms thereof raised by articles thereunder on the chute 20 so that the upper contacts of these switches will be closed. This will complete a circuit, as before mentioned, from conductor 85 through the switches B and C and solenoid 80 to ground, thereby energizing solenoid 80 and causing it to admit air to the air motor 78. Air motor 78 being supplied with air will move the rod 77 thereof to the right as shown in FIG. 8 to rotate door shaft 66 and open detour door 68. Detour door 68 will then occupy the position shown in dotted lines in FIG. 9, and articles descending the chute will strike the arcuate deflector 71 and be deflected onto the detour chute 28. As long as the jam remains in the press or on chute 20, the switches B and C will remain in their upper contact positions, and the detour door 68 will remain open.

When the jam is cleared and the articles under the switches B and C, or either of them, are permitted to descend the chute, the circuit including conductor 89 will be broken. It will be recalled, however, that with the rod 77 to the right (detour door 68 open) the rod 77 will not be in contact with switch E, and hence the contacts thereof will be closed. In order to prevent an article descending the intake section 27 of the chute from being caught in the detour door 68 while it is closing, the switch A is positioned to sense an article on that section of the chute. Should an article underlie the switch A so that the contacts thereof are closed, at the same time that the detour door 68 is open (switch E closed) and the jam is cleared to the extent that either or both of switches B and C return to the position in which contact is had with either contact BL or CL, a circuit will be made from conductor 85 through one or both of switches B and C, through switch A which has an article thereunder and through switch E, thence to and through the solenoid 80. This circuit will also, therefore, cause the air motor 78 to be energized and the detour door 68 held open. As will be understood, if the jam is cleared so that either or both of switch arms BA and CA rotate downwardly towards the floor of the chute in the absence of an article, and should there be no article under switch A, then both of the circuits to solenoid 80 will be broken, and air will no longer be supplied to air motor 78, and it will then cause the detour door 68 to return to the full line position shown in FIG. 9.

There has been provided a chute that is capable of operating cyclically and synchronously with a machine to feed articles to the machine. The feed section of the chute has parts that are economical to manufacture and that are readily adjusted with the synchronizing mechanism and with each other. The chute herein provided will sense a jam thereon, and cause the actuation of a detour door to detour subsequent articles and thus prevent a jam all the way along the entire system. The detour door is configured so that it will readily and rapidly re-direct articles descending at a fairly rapid rate along the chute, without damage to the articles, and a control system is provided which will prevent the reclosing of the detour door should there be a danger that an article will be caught in the door when it is closing. The chute of the present invention will not only detour articles when a jam occurs, but will also re-direct the articles when the jam is eliminated.

It will be obvious to those skilled in the art that various changes may be made without departing from the spirit of the invention and therefore the invention is not limited to what is shown in the drawings and described in the specification but only as indicated in the appended claims.

What is claimed is:

1. In a chute system for feeding articles to a press or the like, an inclined feed chute having a plurality of longitudinally spaced apertures in the floor thereof, a longitudinal drive shaft journaled on the underside of said chute and having a plurality of spaced detents secured thereto in registry with said apertures, each said detent having a part thereof extendable through the corresponding aperture during a part of each revolution of said shaft, successive detents being alternately oriented out of phase on said drive shaft, a rock shaft journaled transversely above said chute below said drive shaft, a stop arm secured to said rock shaft and extending into said chute, a cyclically operating machine at the discharge end of said chute, means for rotating said drive shaft and rocking said rock shaft in timed relation to said machine, an opening in said chute above said drive shaft, a door shaft journaled transversely below said chute adjacent the lower edge of said opening, a detour door secured adjacent its lower end to said door shaft and having a planar upper surface, an arcuate deflector joined to the underside of said detour door at the leading and upper edge thereof and spaced beneath said detour door in the vicinity of the lower edge thereof, solenoid operated motor means connected to said door shaft for rocking said door shaft to open or close said door, a detour chute beneath said door and opening generally tangent to the lower edge of said deflector in the open position of said door, first article responsive switch means controlled by the position of said door, second and third longitudinally spaced article-responsive switch means in said chute and controlled by the presence of articles on said chute between said detour door and the uppermost detent, fourth article-responsive switch means in said chute and above said detour chute and controlled by the presence of articles on said chute above said door, first circuit means connecting in series said first and fourth switch means and said solenoid operated motor means for energizing said solenoid operated motor means when an article underlies said fourth switch means, and said door is open, and second circuit means including connecting in series said second and third switch means and said solenoid operated motor means for energizing said solenoid operated motor means and opening said door when an article underlies said second and third switch means.

2. A chute system as in claim 1, the said part of each said detent being of relatively great radius, and each said detent having another part of relatively smaller radius, the part of relatively great radius having a circumferential extent greater than the circumferential extent of the other part.

3. In a chute system for feeding articles to a press or the like, an inclined feed chute having a plurality of longitudinally spaced apertures in the floor thereof, a longitudinal drive shaft journaled on the underside of said chute and having a plurality of spaced detents secured thereto in registry with said apertures, each said detent having a part thereof extendable through a corresponding aperture during a part of each revolution of said shaft, successive detents being alternately oriented out of phase on said drive shaft, a rock shaft journaled transversely above said chute below said drive shaft, a stop arm secured to said rock shaft and extending into said chute, a cyclically operating machine at the discharge end of said chute, means for rotating said drive shaft and rocking said rock shaft in timed relation to said machine, an opening in said chute above said drive shaft, a door shaft journaled transversely below said chute adjacent the lower edge of said opening, a detour door secured adjacent its lower end to said door shaft, solenoid operated motor means connected to said door shaft for rocking said door shaft to open or close said door, a detour chute beneath said door and opening, first article-responsive switch means controlled by the position of said door, second and third longitudinally spaced article-responsive switch means in said chute and controlled by the presence of articles on said chute between said detour door and the uppermost detent, fourth article-responsive switch means for sensing in said chute and above said detour door and controlled by articles on said chute above said door, first circuit means connecting in series said first and fourth switch means and said solenoid operated motor means for energizing said solenoid operated motor means when an article underlies said fourth switch means and said door is open, and second circuit means connecting in series said second and third switch means and said solenoid operated motor means for energizing said solenoid operated motor means and opening said door when an article underlies said second and third switch means.

4. In a chute system for feeding articles to a press or the like, an inclined feed chute having a plurality of longitudinally spaced apertures in the floor thereof, a longitudinal drive shaft journaled on the underside of said chute and having a plurality of spaced detents secured thereto in registry with said apertures, each said detent having a part thereof extendible through the corresponding aperture during a part of each revolution of said shaft, successive detents being alternately oriented out of phase on said drive shaft, a rock shaft journaled transversely above said chute downwardly on said drive shaft, a stop arm secured to said rock shaft and extending into said chute, a cyclically operating machine at the discharge end of said chute, means for rotating said drive shaft and rocking said rock shaft in timed relation to said machine, an opening in said chute upwardly of said drive shaft, a door shaft journaled transversely below said chute adjacent the lower edge of said opening, a detour door secured adjacent its lower end to said door shaft, operating means connected to said door shaft for rocking said door shaft to open or close said door, a detour chute beneath said door and opening, first means controlled by the position of said door, second and third longitudinally spaced means controlling automatic opening of said door and controlled by the presence of articles on said chute between said detour door and the uppermost detent, fourth means controlled by the presence of articles on said chute above said door, energizing means connectable between said first and fourth means and operatively connected to said operating means for rocking said door shaft for holding open said door when an article is controlling said fourth means and said door is open, and second energizing means connecting said second and third means and operatively connected to said operating means for rocking said door shaft for opening said door when articles are controlling said second and third means.

5. In a chute system for feeding articles to a press or the like, an inclined feed chute having a plurality of apertures in the floor thereof, a drive shaft journaled on the underside of said chute and having a plurality of spaced detents secured thereto in registry with said apertures, each said detent having a part thereof extendable through the corresponding aperture during a part of each revolution of said shaft, successive detents being alternately oriented out of phase on said drive shaft, a rock shaft journaled transversely above said chute downwardly of said drive shaft, a stop arm secured to said rock shaft and extending into said chute, a cyclically operating machine at the discharge end of said chute, means for rotating said drive shaft and rocking said rock shaft in timed relation to said machine, an opening in said chute upwardly of said drive shaft, a door shaft journaled transversely below said chute, a detour door secured to said door shaft, operating means connected to said door shaft for rocking said door shaft to open or close said door, a detour chute beneath said door and opening, first means controlled by the position of said door, second and third longitudinally spaced means controlled by the presence of articles on said chute between said detour and the uppermost detent, fourth means controlled by the presence of articles on said chute above said door, energizing means connectable between said first and fourth means and operatively connected to said operating means for rocking said door shaft for holding open said door when an article is controlling said operating fourth means and said door is open, and second energizing means connecting said second and third means and operatively connected to said operating means for rocking said door shaft for opening said door when articles are controlled by said second and third means.

6. In a chute system for feeding articles to a press or the like, an inclined chute, feed means on said chute for permitting articles to descend said chute in step-by-step fashion, a rock shaft journaled transversely above said chute downwardly of said feed means, a stop arm secured to said rock shaft and extending into said chute, a cyclically operating machine at the discharge end of said chute, means for operating said feed means and rocking said rock shaft in timed relation to said machine, an opening in said chute upwardly of said feed means, a door shaft journaled transversely below said chute, a detour door secured to said door shaft, operating means connected to said door shaft for rocking said door shaft to open or close said door, a detour chute beneath said door and opening, first means controlled by the position of said door, second and third longitudinally spaced means controlled by the presence of articles on said chute between said detour door and said feed means, fourth means controlled by the presence of articles on said chute above said door, first energizing means connectable between said first and fourth means and operatively connected to said operating means for rocking said door shaft for holding open said door when an article is controlling said fourth means and said door is open, and second energizing means connecting said second and third means and operatively connected to said operating means for rocking said door shaft and opening said door when articles are controlling said second and third means.

7. In a chute system for feeding articles to a press or the like, an inclined chute, feed means on said chute for permitting articles to descend said chute in step-by-step fashion, a stop arm rockably mounted on said chute and extending thereinto, a cyclically operating machine at the discharge end of said chute, means for operating said feed means and rocking said stop arm in timed relation to said machine, an opening in said chute upwardly of said feed means, a door shaft journaled transversely below said chute, a detour door secured to said door shaft, operating means connected to said door shaft for rocking said door shaft to open or close said door, a detour chute beneath said door and opening, first means controlled by the position of said door, second and third spaced means controlled by the presence of articles on said chute between said detour door and said feed means, fourth means controlled by the presence of articles on said chute above said door, energizing means connectable between said first and fourth means and operatively connected to said operating means for rocking said door shaft for holding open said door when an article is controlling said fourth means and said door is open, and second energizing means connecting said second and third means and operatively connected to said operating means for rocking said door shaft and opening said door when articles are controlling said second and third means.

8. In a chute system for feeding articles to a press or the like, an inclined chute, power operated and synchronized feed means on said chute for permitting articles to descend said chute in step-by-step fashion, a lateral, lower opening in said chute upwardly of said feed means, a detour door for closing said opening, operating means connected to said door for swinging said door to an open or closed position, a detour chute beneath said door and opening, first switch means controlled by the position of said door, second and third spaced switch means controlled by the presence of articles on said chute between said detour door and said feed means, fourth switch means controlled by the presence of articles on said chute above said door, first circuit means connecting in series said first and fourth means and operatively connected to said door operating means for holding open said door when an article controls said fourth switch means and said door is open, and second circuit means connecting in series said second and third switch means and operatively connected to said door operating means for opening said door when articles are controlling said second and third switch means.

9. The apparatus of claim 7, and further including means for manually rocking said stop arm independently of said means for operating said feed means and rocking said stop arm in timed relation to said machine.

10. The apparatus of claim 9, said last mentioned means including a cam shaft having a cam thereon, a follower arm having a follower engaging the cam, and a link means connecting said follower arm with said stop arm, and said means for manually rocking the stop arm including slotted link means having a lost motion connection with said follower arm and engageable therewith for removing said follower from said cam and rocking said stop arm into stopping position.

References Cited in the file of this patent

UNITED STATES PATENTS

| | | |
|---|---|---|
| 880,119 | Blakeslee | Feb. 25, 1908 |
| 2,311,732 | Buchholz et al. | Feb. 23, 1943 |
| 2,595,022 | Temple | Apr. 29, 1952 |
| 2,670,835 | Huttmann | Mar. 2, 1954 |
| 2,802,560 | Engleson et al. | Aug. 13, 1957 |
| 2,867,312 | Lape | Jan. 6, 1959 |
| 2,874,821 | Ganter | Feb. 24, 1959 |